(12) United States Patent
Matteo (10) Patent No.: US 11,388,894 B1
(45) Date of Patent: *Jul. 19, 2022

(54) FISHING REEL WITH INCREMENTAL METERING SYSTEM AND MODULAR BALANCING WEIGHTS

(71) Applicant: Joseph C. Matteo, Walland, TN (US)

(72) Inventor: Joseph C. Matteo, Walland, TN (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/859,448

(22) Filed: Apr. 27, 2020

Related U.S. Application Data (63) Continuation-in-part of application No. 15/918,714, filed on Mar. 12, 2018, now Pat. No. 10,667,505.

(60) Provisional application No. 62/477,007, filed on Mar. 27, 2017.

(51) Int. Cl.
*A01K 89/01* (2006.01)
*A01K 89/015* (2006.01)
*A01K 89/016* (2006.01)

(52) U.S. Cl.
CPC ...... *A01K 89/01921* (2015.05); *A01K 89/016* (2013.01); *A01K 89/0124* (2015.05); *A01K 89/0193* (2015.05); *A01K 89/01925* (2015.05)

(58) Field of Classification Search
CPC ........ A01K 89/01921; A01K 89/01924; A01K 89/01925; A01K 89/0193; A01K 89/05; A01K 89/051; A01K 89/059; A01K 89/011223; A01K 89/01127; A01K 89/0124; A01K 89/016
See application file for complete search history.

(56) References Cited

U.S. PATENT DOCUMENTS

| | | | |
|---|---|---|---|
| 2,089,031 A * | 8/1937 | MacDonald | A01K 91/20 242/223 |
| 2,742,703 A | 4/1956 | Riede | |
| 2,959,370 A | 11/1960 | Johnson | |
| 4,733,830 A | 3/1988 | Hollander | |
| 4,807,828 A | 2/1989 | Yamaguchi | |
| 4,883,238 A | 11/1989 | Harder | |
| 5,489,070 A | 2/1996 | Puryear | |
| 5,568,787 A * | 10/1996 | Forslund | A01K 89/006 116/315 |
| 5,626,303 A | 5/1997 | Bringsen | |
| 5,755,391 A | 5/1998 | Sacconi | |
| 5,857,632 A * | 1/1999 | Arkowski | A01K 89/018 242/297 |
| 6,115,955 A * | 9/2000 | Sledge | A01K 87/08 43/23 |
| 6,561,033 B2 * | 5/2003 | Nanbu | G01S 15/88 242/223 |
| 10,667,505 B2 * | 6/2020 | Matteo | A01K 89/016 |
| 10,952,422 B1 * | 3/2021 | Carlson | A01K 97/01 |

(Continued)

*Primary Examiner* — Emmanuel M Marcelo
(74) *Attorney, Agent, or Firm* — Pitts & Lake, P.C.

(57) ABSTRACT

A fly-fishing reel having with a modular weight system for customizing the weight of the fly-fishing reel in order for an angler to use the fly-fishing reel with a variety of fly rods and still maintain a desired balance point and an integrated incremental meter device. The modular weight system allows the balance point of the rod and fly-fishing reel to be adjusted. The incremental metering device is adapted for keeping a tally of selected data, such as, though not limited to, the number of fish caught or released.

22 Claims, 9 Drawing Sheets

(56) References Cited

U.S. PATENT DOCUMENTS

| | | | |
|---|---|---|---|
| 2005/0103912 A1* | 5/2005 | Koelewyn | A01K 89/0162 |
| | | | 242/303 |
| 2014/0090287 A1* | 4/2014 | Olson | A01K 97/12 |
| | | | 43/17 |
| 2015/0136890 A1* | 5/2015 | Koelewyn | A01K 89/01925 |
| | | | 242/283 |
| 2015/0272103 A1* | 10/2015 | Blosch | A01K 89/0192 |
| | | | 29/428 |

* cited by examiner

FISHING REEL WITH INCREMENTAL METERING SYSTEM AND MODULAR BALANCING WEIGHTS

CROSS-REFERENCE TO RELATED APPLICATIONS

This application claims the benefit of U.S. Provisional Patent Application No. 62/477,007, filed on Mar. 27, 2017, and of U.S. Non-Provisional patent application Ser. No. 15/918,714, which was filed on Mar. 12, 2018, each of which is incorporated herein in its entirety by reference.

STATEMENT REGARDING FEDERALLY SPONSORED RESEARCH OR DEVELOPMENT

Not Applicable

BACKGROUND OF THE INVENTION

1. Field of Invention

The invention relates to a fishing reel. More particularly, it relates to a fly-fishing reel having an integrated incremental meter device for keeping a tally along with a modular weight system for customizing the weight of the fly-fishing reel.

2. Description of the Related Art

The sport of fishing has developed with technology to improve performance and reduce weight of components as well as a focus on conservation and artisanship. Specifically, a focus on catch and release to help conserve native species of fish is increasingly popular. As will be appreciated by those who enjoy and are skilled in the art of fishing, particularly fly fishing, it is desirable to balance the rod and reel at the grip in the fisherman's hand. It is also desirable to catch and release fish to preserve them and to keep track of the day's catch. The attached invention discloses an incremental metering device integrated into the fishing reel to tally fish caught. In addition, this invention also includes the ability to precisely match the performance of a fishing reel with the rod to which it is attached. More specifically, artisan fishing rods made of bamboo and other materials are often heavier than state-of-the-art carbon or fiberglass rods and not well balanced when coupled to modern compact and lightweight fishing reels. However, it remains desirable to have a small diameter reel for many fishing situations. These two features create a reel that addresses two needs for the modern fisherman.

BRIEF SUMMARY OF THE INVENTION

The fly-fishing reel of the present invention includes an integrated incremental meter integrated into the reel mount with a magnified viewing window and detent alignment for incrementally advancing the meter in order to keep a tally of selected data, such as the number of fish caught/released, the number of miles hiked to a selected fishing spot, days spent fishing, or other data the angler may wish to tally. Further, internal to the reel, several removable weights allow the user to increase or decrease the total weight of a compact diameter reel to balance the rod to the fisherman's preference. This is particularly valuable when used with custom rods or artisan rods that are typically heavier than carbon or fiberglass. As will be recognized by those skilled in the art, these heavier reels require a larger diameter, and thus heavier, reel to maintain a desired balance point. However, it is often desirable to use a smaller diameter, more compact, reel. The device of the present invention utilizes a modular weight system for customizing the weight of the fly-fishing reel in order for an angler to use the fly-fishing reel with a variety of fly rods and still maintain a desired balance point. In this regard, by selectively altering the weight of the fly-fishing reel with the modular weight system, the balance point of the rod with the fly-fishing reel of the present invention mounted thereon can be adjusted. The fishing-reel of the present invention further includes a line retainer clip.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

Figure 11:
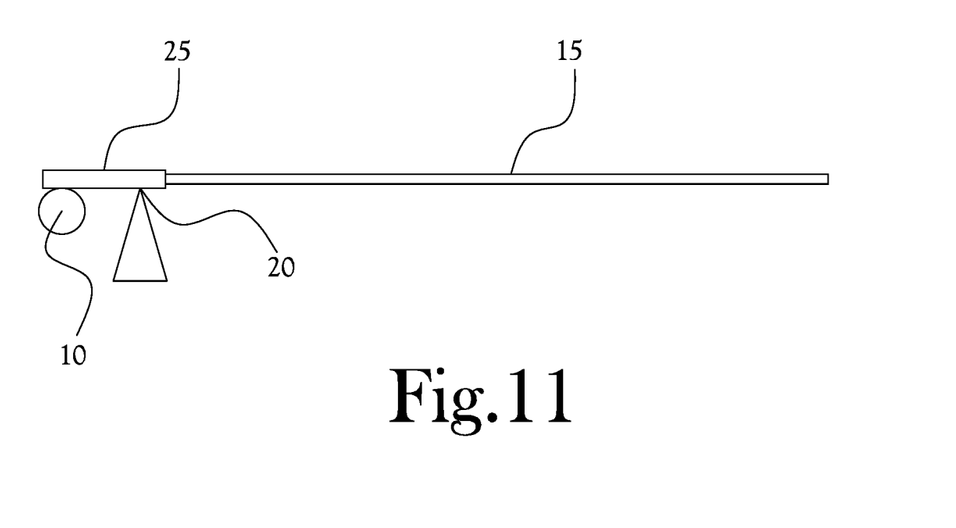
FIG. 11 is a schematic view of a rod and reel assembly illustrating a desired balance point.

The present invention is a fly-fishing reel 10 having an incremental metering device for keeping a tally of selected data. Fly-fishing reel 10 further includes a modular weight system integrated into fly-fishing reel 10 in a simple, readily adjustable, and compact manner. FIGS. 1-10 illustrate fly-fishing reel 10, constructed in accordance with the present invention. As will be discussed in greater detail below, the modular weight system for customizing the weight of fly-fishing reel 10 allows an angler to use fly-fishing reel 10 with a variety of fly rods, of various lengths and constructed from a variety of materials, and still maintain a desired balance point. The balance point relationship of fly-fishing reel 10 and the fly rod 15 is illustrated schematically in FIG. 11. As those skilled in the art will recognize, this balance point 20 shifts along the length of the handle 25 and/or fly rod 15 as the weight of fly-fishing reel 10 changes, the length of the fly rod 15 changes, and/or the weight of the fly rod 15 changes. Those skilled in the art will appreciate the fact that the weight of fly rod 15 is a factor of both the length of fly rod 15 and the material from which fly rod 15 is manufactured. As illustrated in FIG. 11, and as alluded to above, it is desirable to balance fly-fishing reel 10 against the weight, and length, of fly rod 15. And, it is desirable for this balance point 20 to coincide with the forward portion of handle 25.

Fly-fishing reel 10 of the present invention utilizes a modular, interchangeable weighting system in order to allow the user to balance and match fly-fishing reel 10 to wood, carbon, or fiber glass rods of differing lengths and weights. While the present invention is described herein as a fly-fishing reel, there is no intention on the part of the inventor herein to limit the invention to fly-fishing but rather encompasses and could be utilized in conjunction with other types of fishing reels. While the present invention is not intended to be limited to a particular size fishing reel, in an exemplary embodiment, fly-fishing reel 10 is a small, compact reel. As will be recognized by those skilled in the art, fly-fishing reel 10 includes a reel foot, defined herein as hanger plate 30, which engages the reel seat (not shown) of the fly-rod 15. Fly-fishing reel 10 further includes a frame 40 having an inner surface 45, a spool 50 having an arbor 60, a line guard 50, and a handle 70, which, as will be recognized by those skilled in the art, allows the user to wind the spool 50.

The ability to adjust the weight of fly-fishing reel 10 and thereby adjust the balance point 20, allows the user to use compact, smaller diameter reels with longer and heavier rods. The number and size of the modular weights can be varied. In this regard, in an exemplary embodiment, fly-fishing reel 10, utilizes at least two removable weights, defined for purposes of illustration herein as an outer counterweight 100 and an inner counterweight 110. In an exemplary embodiment, outer counterweight 100 and an inner counterweight 110 are in a concentric relationship and are removably securable to the frame 40, preferably to the inner surface 45 of the frame 40, by means of threaded fasteners 120. Further, the fact that outer counterweight 100 and an inner counterweight 110 are removably securable to the inner surface 45 of frame 40 allows the user to increase or decrease the total weight of a compact diameter fly-fishing reel 10 to balance the rod to the fisherman's preference. As stated above, the number of modular weights is variable and can be increased. This is particularly valuable when used with custom rods that are heavier than carbon or fiberglass and a small diameter fly-fishing reel 10 is desired. The weighting system could be discrete weights or fill material such as powder-based weight, a dense liquid weight, beads, magnets, wire-shaped weight etc. In an exemplary embodiment, the modular weights are different sizes, define arcuate circular segments and define substantially concentric counterweights, i.e. outer counterweight 100 and an inner counterweight 110. This arrangement allows four different weight combinations to be utilized thus allowing for greater adjustment of a preferred balance point. In this regard, and in order of lightest to heaviest combinations, fly-fishing reel 10 could be utilized alone; without an additional counterweight; fly-fishing reel 10 could be utilized with only the inner counter weight 110; fly-fishing reel 10 could be utilized with only the outer counterweight 100; or fly-fishing reel 10 could be utilized with both outer counterweight 100 and an inner counterweight 110 as illustrated in the Figures. Further, it will be appreciated that counterweights 100 and 110 could be made from various dense metals such as brass, lead, palladium, tungsten, steel, platinum, or other similarly dense materials. It will also be appreciated that counterweights 100 and 110 could be split such that four arcuate counterweights are provided for greater variability of weight combinations. Additionally, fly-fishing reel 10 further includes a front and rear line retainer clip 80 secured to the base of hanger plate 30 for securing the fishing line when not in use.

Figure 1:
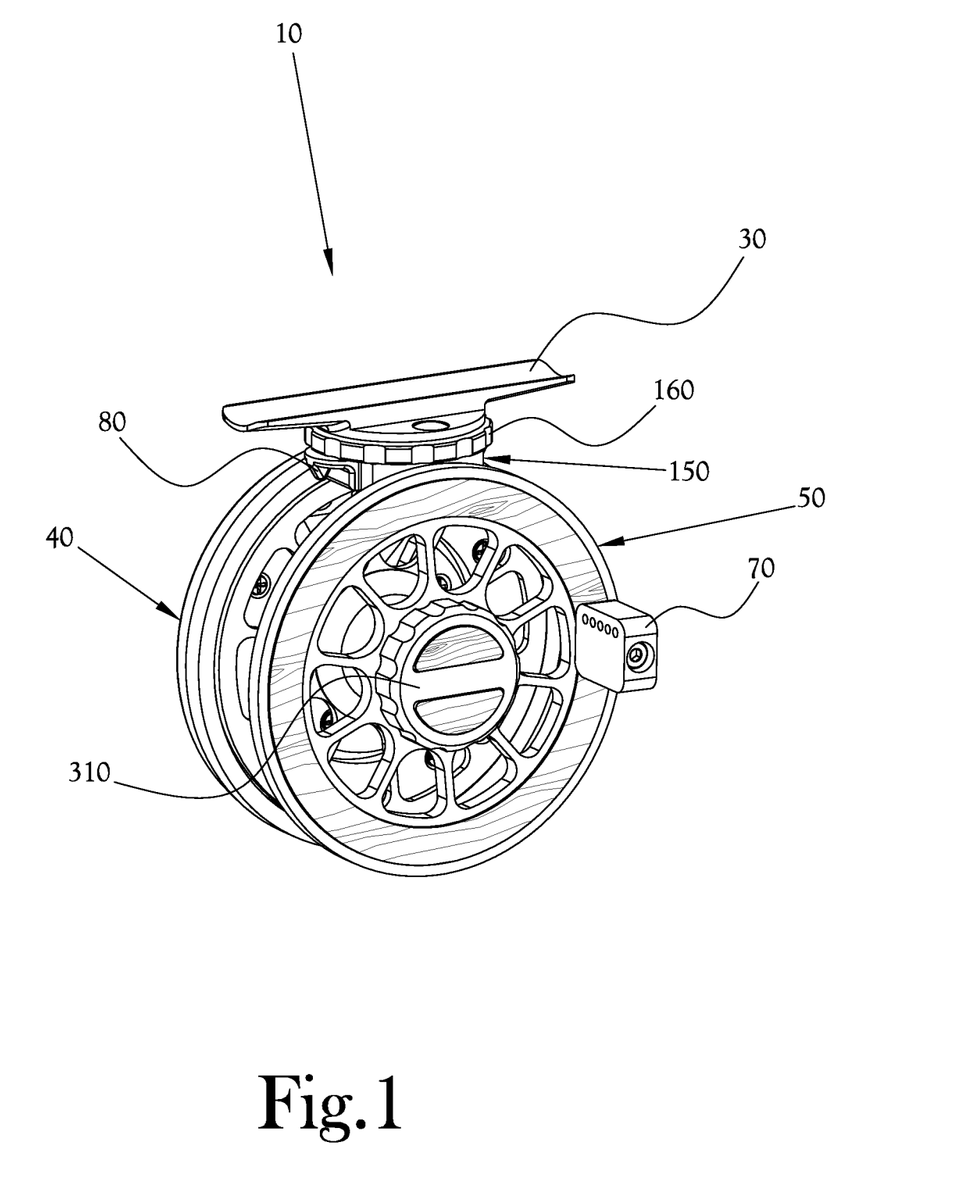
FIG. 1 is an isometric view of the fly-fishing reel, having an integrated incremental meter device and modular balancing weights, of the present invention.
Figure 2A:
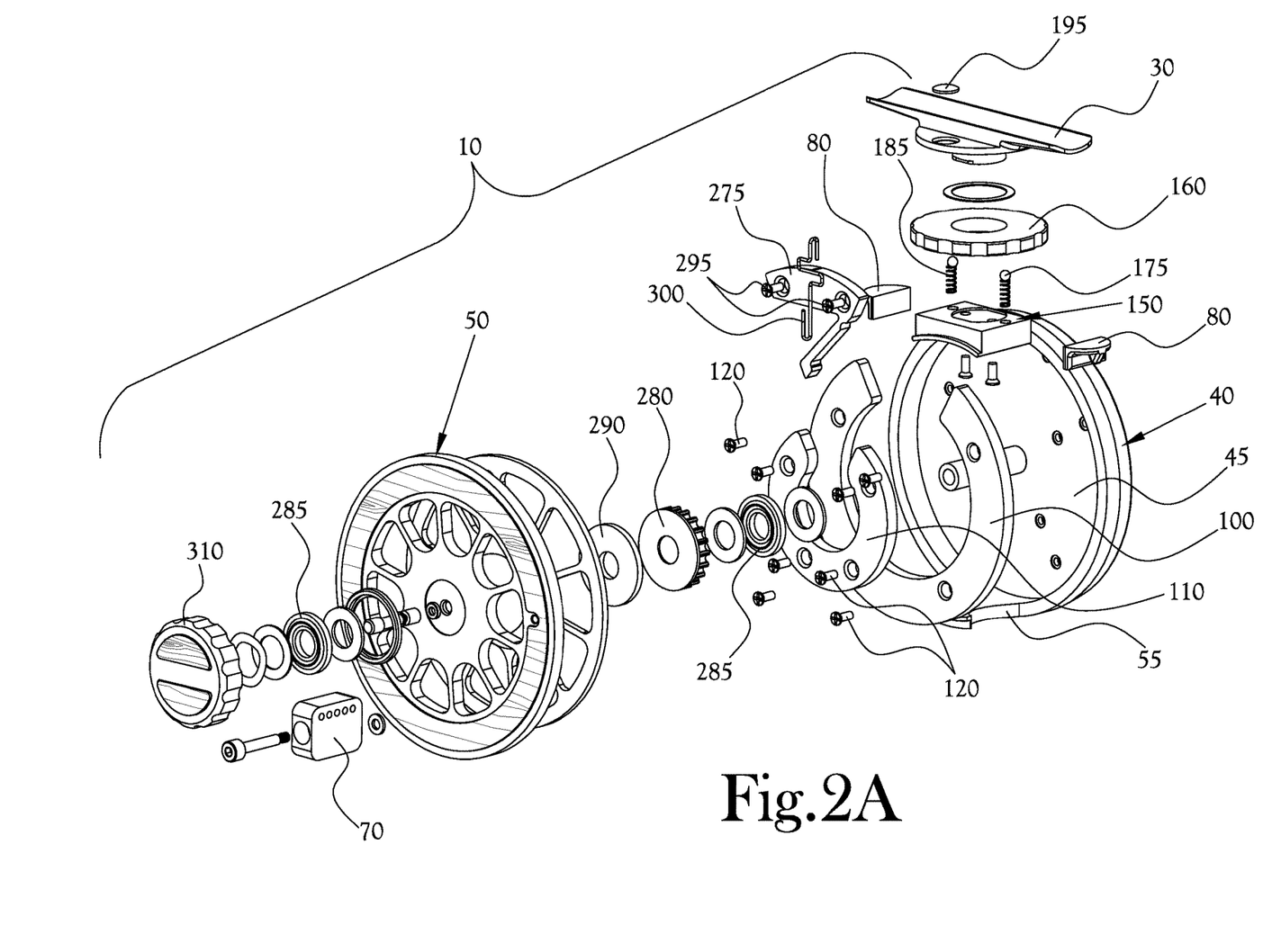
FIG. 2A is an exploded view of the fly-fishing reel illustrated in FIG. 1.
Figure 2B:
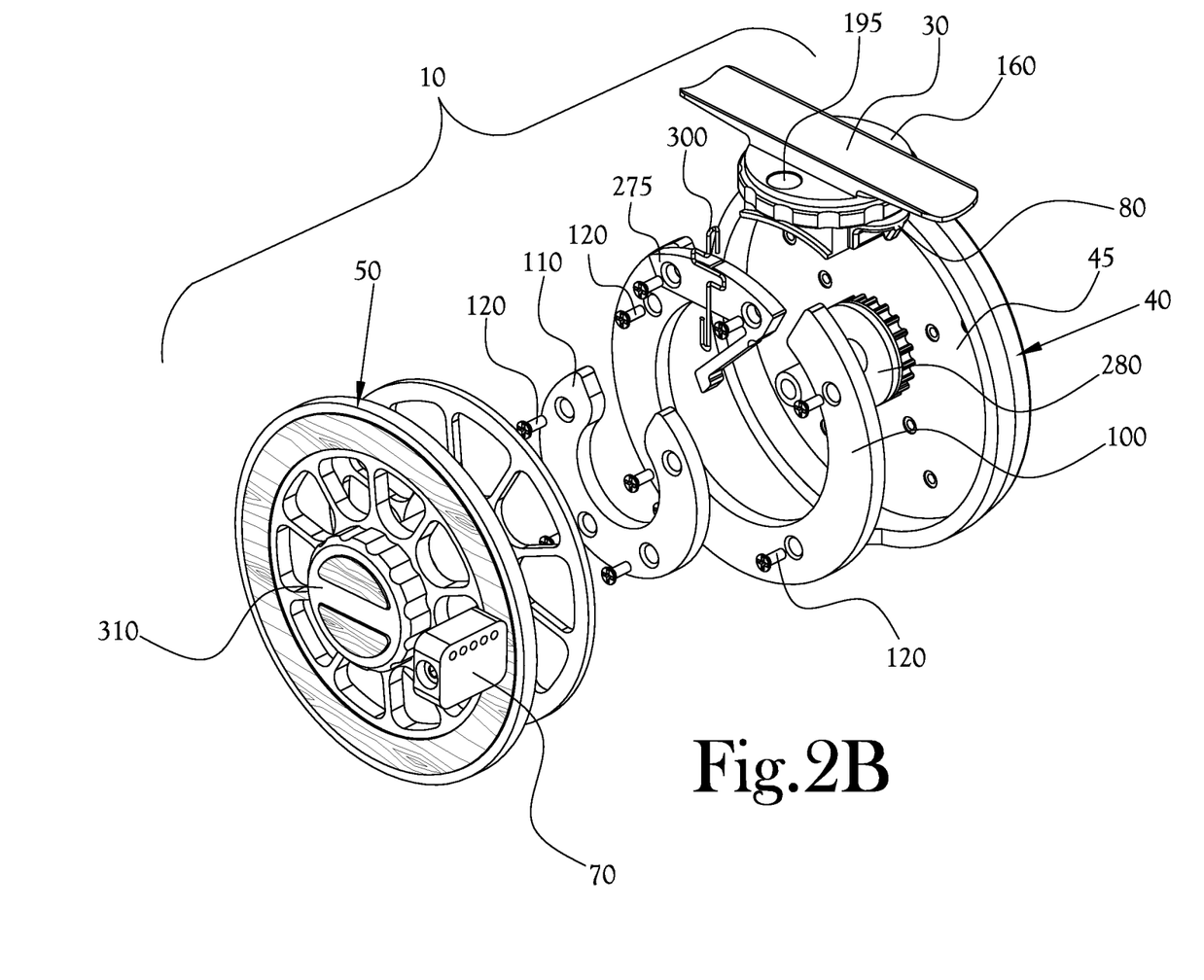
FIG. 2B is a further partially exploded view of the fly-fishing reel illustrated in FIG. 1.
Figure 3:
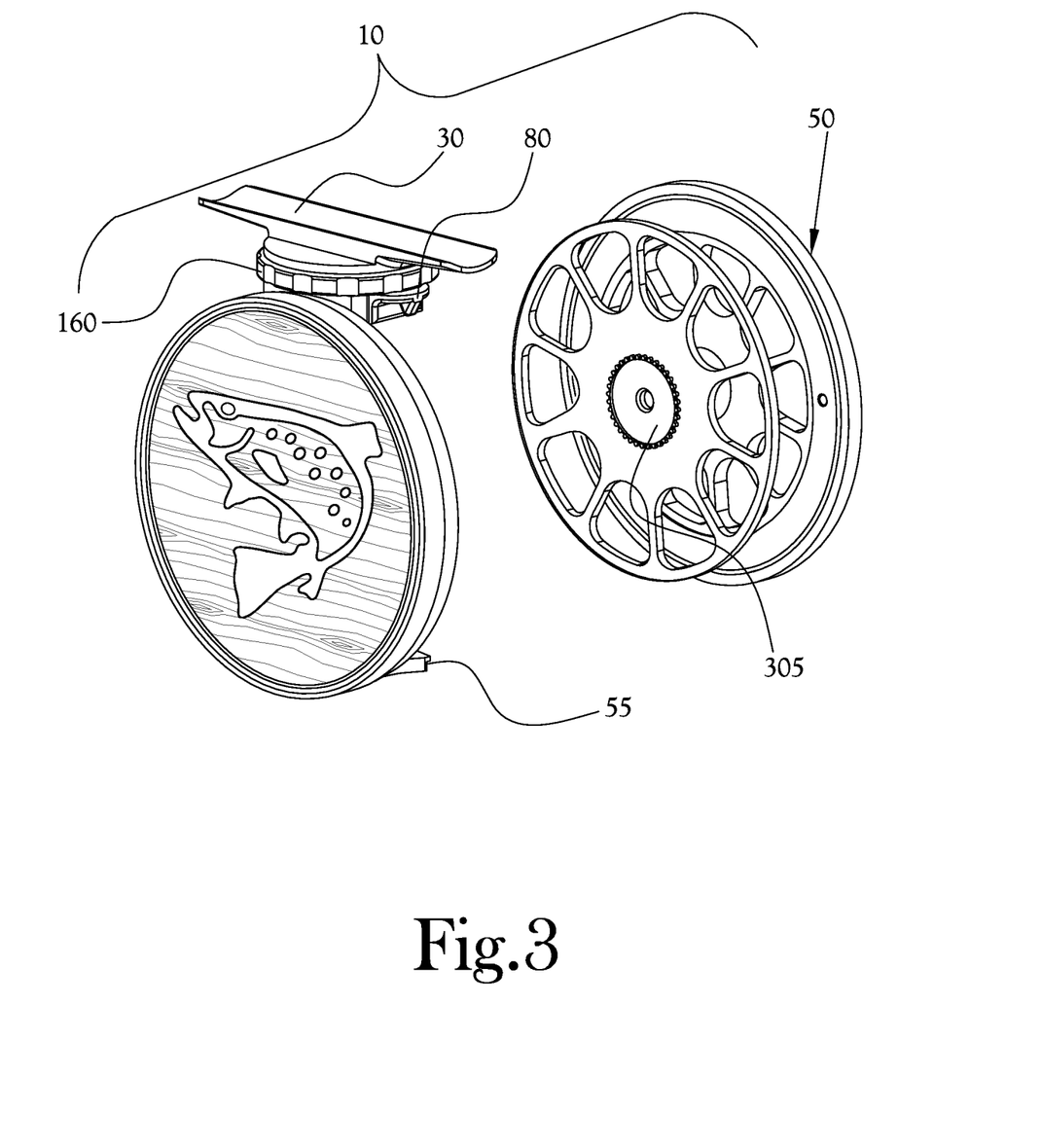
FIG. 3 is an isometric view of the inner surface of the spool of the fly-fishing reel illustrated in FIG. 1.
Figure 4:
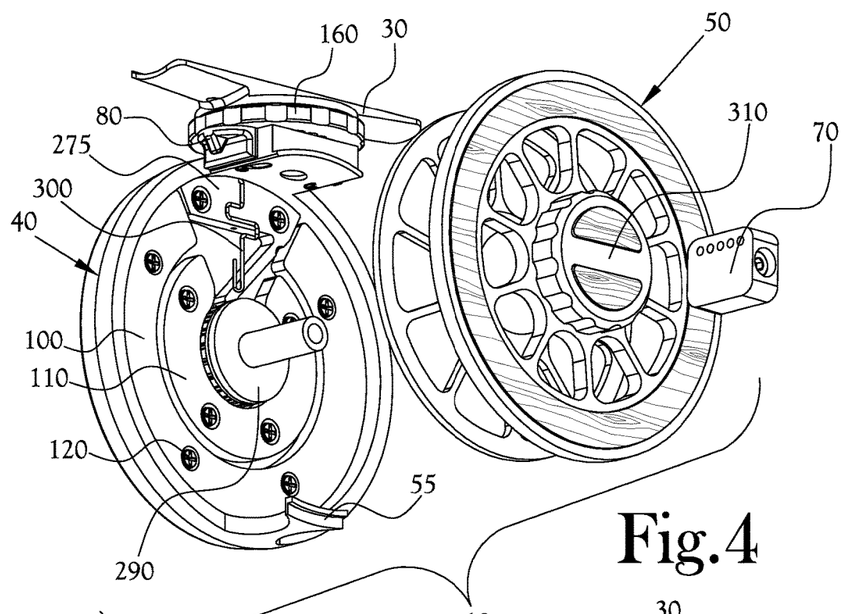
FIG. 4 is a partially exploded view of the fly-fishing reel illustrated in FIG. 1 in which the spool has been removed from the frame and inner arbor.
Figure 5:
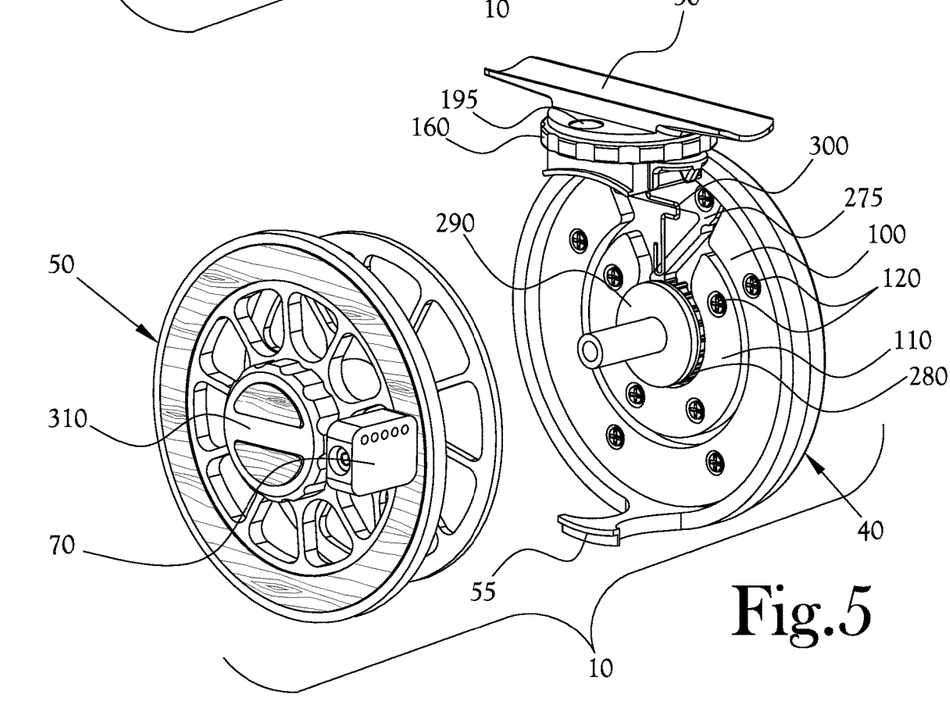
FIG. 5 is a further partially exploded view of the fly-fishing reel illustrated in FIG. 1 in which the spool has been removed from the frame and inner arbor.
Figure 6:
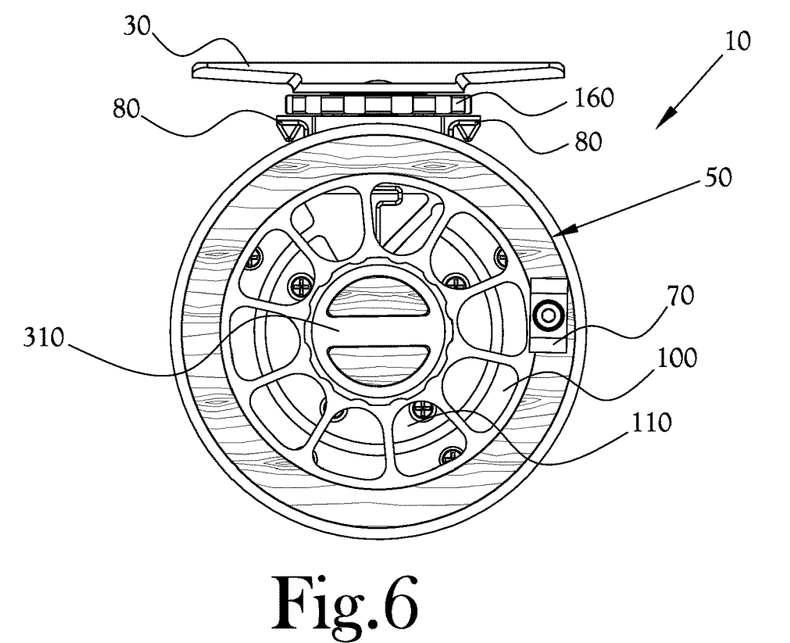
FIG. 6 is a left side elevation view of the fly-fishing reel illustrated in FIG. 1.
Figure 7:
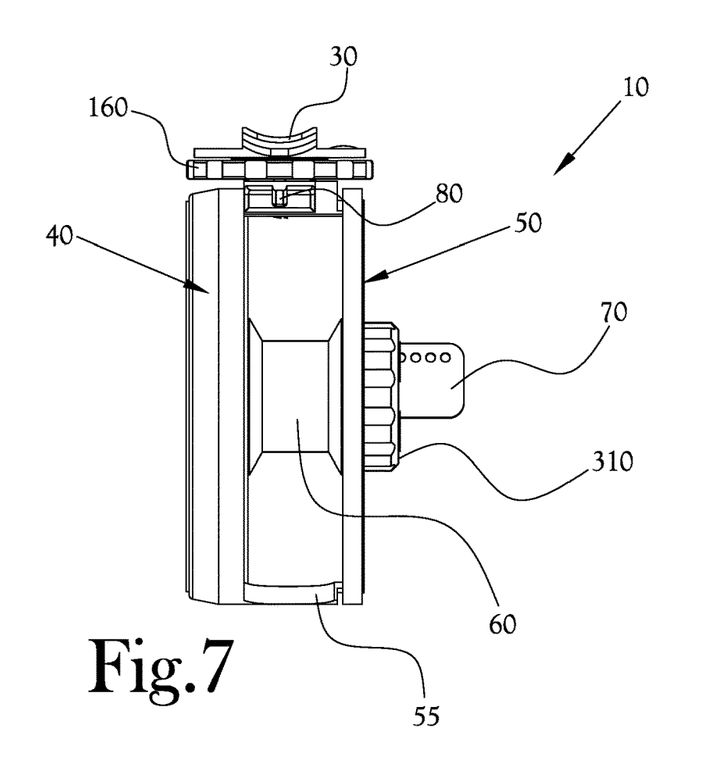
FIG. 7 is a front elevation view of the fly-fishing reel illustrated in FIG. 1.
Figure 8A:
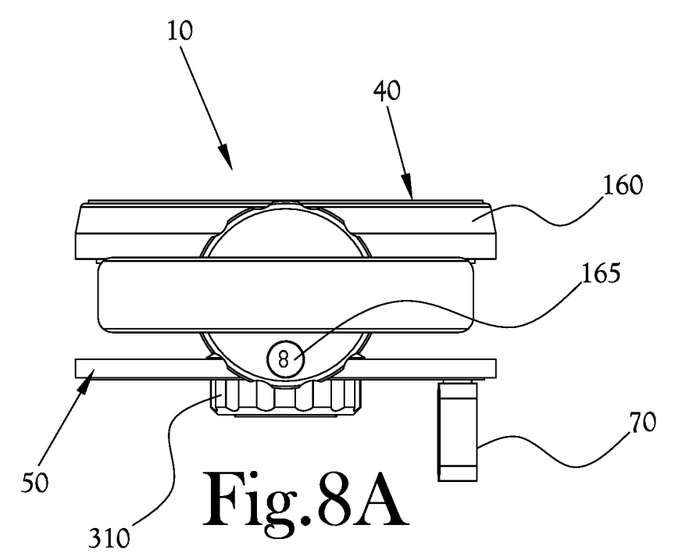
FIG. 8A is a top plan view of the fly-fishing reel illustrated in FIG. 1.
Figure 8B:
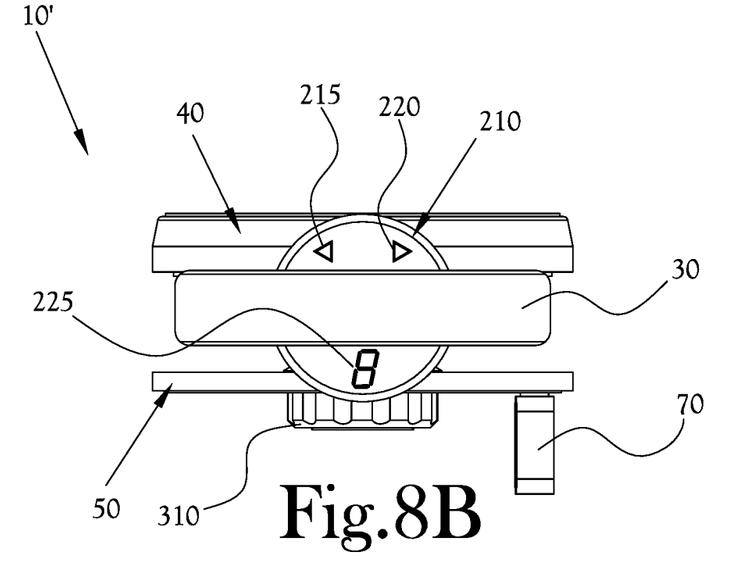
FIG. 8B is a top plan view of a fly-fishing reel utilizing an electronic incremental metering assembly.
Figure 9A:
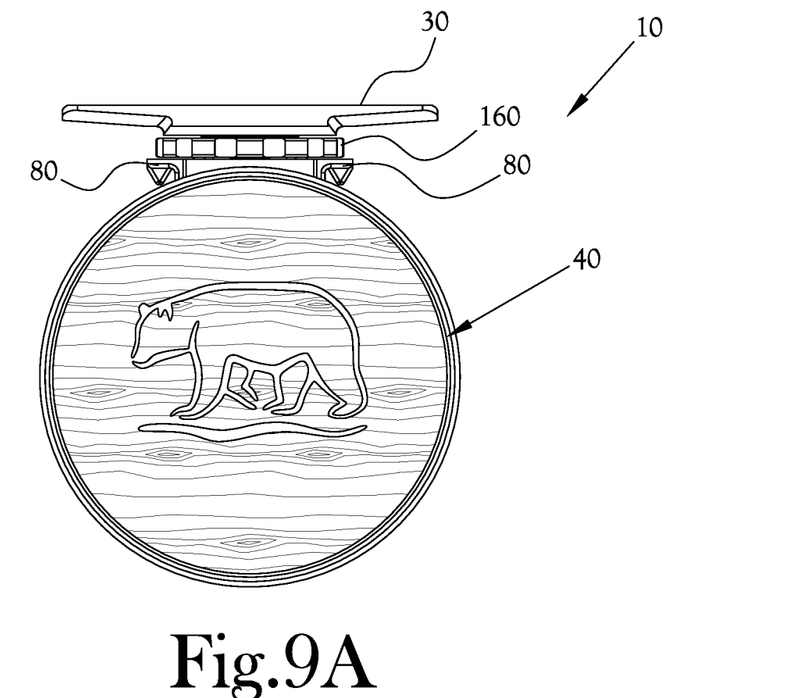
FIGS. 9A and 9B are right side elevation views of exemplary embodiments of decorative inlays for the frame of the fly-fishing reel illustrated in FIG. 1.
Figure 9B:
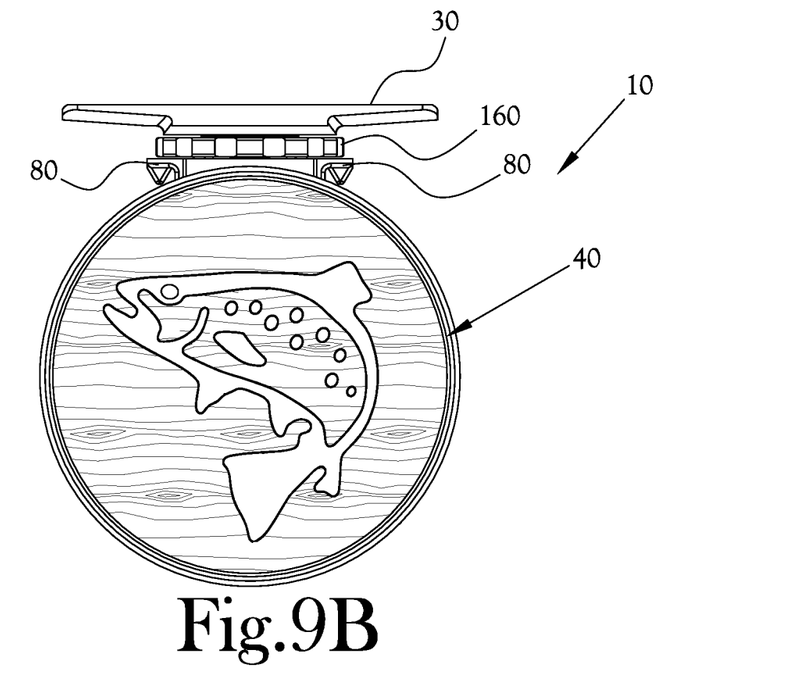
Figure 10:
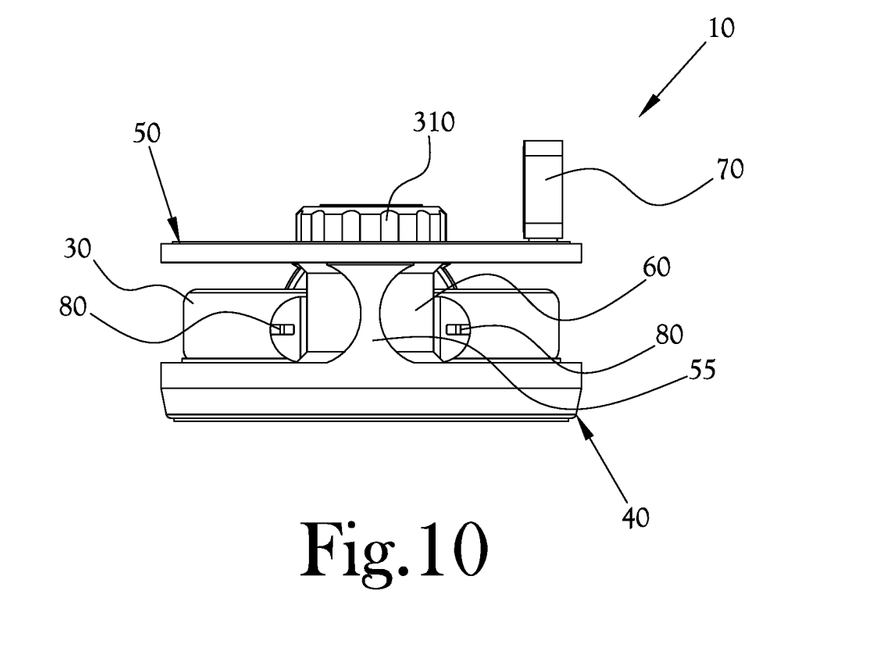
FIG. 10 is a bottom plan view of the fly-fishing reel illustrated in FIG. 1.

The incremental metering assembly 150 shown in the Figures is, in an exemplary embodiment, a mechanical device. The incremental metering assembly 150 is comprised of an incremental meter wheel 160 having numeric indicia 165, detent ball bearings 175 and springs 185 adapted for detent alignment for positioning the meter wheel 160, and a magnifier lens 195 adapted to make selected numeric indicia 165 easier to read. The incremental meter assembly 150 is integrated into the hanger plate 30 with a viewing window defined by meter lens 195. Incremental metering assembly 150 could incorporate a single incremental metering wheel 160 or could incorporate multiple dials for tallying different data sets. The incremental metering assembly 150 can also be used for tracking data other than fish caught such as miles walked, days spent fishing, etc. Further, the incremental meter system could also be electronic. In this regard, as illustrated in FIG. 8B, fishing reel 10' includes an incremental metering assembly that utilizes an electronic module 210 including an integrated circuit that is adapted to respond to adapted to selectively actuated up button 215 or selectively actuated down button 220 and display a tally that is adjusted up or down and display digital numeric indicia 225.

It will be appreciated by those skilled in the art that fly-fishing reel 10 of the present invention also includes an adjustable, variable drag providing fine adjustment across a wide dynamic range of drag and that includes a one-way bearing that, as will be appreciated by those skilled in the art, provides low resistance in a first direction while providing variable drag resistance in a second, opposing direction. In this regard, fishing-reel 10 in an exemplary embodiment utilizes a click and pawl variable drag system having a directional pawl cam 275, a drag gear 280, at least a pair of thrust bearings 285 and a cork washer 290. The directional pawl cam 275 engages drag gear 280. The pawl cam 275 is adapted to provide compact high-load drag resistance in one direction. Further, it will be appreciated that it is desirable to be able to reverse the take-up reel direction in order to accommodate both right- and left-hand anglers. In this regard, by removing screws 295 and reversing pawl cam 275 and re-securing the pawl cam 275 to the inner surface 45 of the frame, the take-up reel direction can be reversed. A wire clicker 300 engages a clicker gear 305 on the inner surface of the spool 50 and provides audible click in both directions. The spring loaded drag knob 310 provides fine adjustment and large dynamic range drag.

While the present invention has been illustrated by description of several embodiments and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, what is claimed is:

1. A fishing reel for tallying incremental data and adapted to be secured to a selected fishing rod, said fishing reel comprising:
   a frame having an inner surface and an outer surface;
   a spool carried by said frame;
   a handle adapted for winding said spool;
   a modular weight system adapted to be removably installed on said fishing reel, said modular weight system including a plurality of interchangeable counterweights, whereby a balance point associated with a combination of said fishing reel and said selected fishing rod is readily adjustable; and
   a hanger plate adapted for securing said fishing reel to said fishing rod.

2. The fishing reel of claim 1 wherein said fishing reel is adapted for use with a fly-fishing rod.

3. The fishing reel of claim 1 wherein said plurality of interchangeable counterweights are removably securable to said frame of said fishing reel, wherein each of said plurality of interchangeable counterweights define arcuate circular segments and are in a concentric relationship to one another.

4. The fishing reel of claim 3 wherein said plurality of interchangeable counterweights are formed from a material selected from a group consisting of brass, lead, palladium, tungsten, steel, and platinum.

5. The fishing reel of claim 1 wherein said plurality of interchangeable counterweights are selected from a group consisting of solid weight, powder-based weight, a dense liquid weight, bead, magnet, and wire-shaped weight.

6. The fishing reel of claim 1 wherein said fishing reel further comprises an adjustable, variable drag having a one-way bearing adapted to provide low resistance in a first direction and variable drag resistance in a second direction.

7. The fishing reel of claim 1 wherein said fishing reel further comprises an adjustable, variable drag including a drag gear, a directional pawl cam removably secured to said inner surface of said frame and adapted to engage said drag gear, and a spring loaded drag knob adapted for adjusting said adjustable, variable drag.

8. The fishing reel of claim 1 wherein said fishing reel further comprises an incremental metering assembly in cooperation with said combination of said fishing reel and said selected fishing rod, said incremental metering assembly being adapted to tally at least a first selected data set incrementally.

9. The fishing reel of claim 8 wherein said incremental metering assembly is defined by an electronic incremental meter including circuitry adapted to respond to at least a selectively actuated up button and a selectively actuated down button and display a tally using digital numeric indicia.

10. The fishing reel of claim 8 wherein said incremental metering assembly is integrated into a reel mount such that it is secured to said hanger plate and further wherein said incremental metering assembly includes at least one incremental meter wheel having numeric indicia adapted for keeping a tally; at least one detent ball in cooperation with a spring adapted for detent alignment for positioning said incremental meter wheel and a lens adapted and aligned for viewing a selected numeric indicia.

11. The fishing reel of claim 10 wherein said lens is adapted for magnifying said selected numeric indicia.

12. The fishing reel of claim 8 wherein said incremental metering assembly is adapted to be integrated into said fishing reel.

13. The fishing reel of claim 8 wherein said incremental metering assembly is integrally attached to said hanger plate.

14. A fishing reel for tallying incremental data and adapted to be secured to a selected fishing rod, said fishing reel comprising:
   a frame having an inner surface and an outer surface;
   a spool carried by said frame;
   a handle adapted for winding said spool;
   an adjustable, variable drag including a drag gear, a directional pawl cam removably secured to said inner surface of said frame and adapted to engage said drag gear, and a spring loaded drag knob adapted for adjusting said adjustable, variable drag;
   a modular weight system adapted to be removably installed on said fishing reel, said modular weight system including a plurality of interchangeable counterweights, whereby a balance point associated with a combination of said fishing reel and said selected fishing rod is readily adjustable; and
   a hanger plate adapted for securing said fishing reel to said fishing rod.

15. The fishing reel of claim 14 wherein said fishing reel is adapted for use with a fly-fishing rod.

16. The fishing reel of claim 14 wherein said plurality of interchangeable counterweights are selected from a group consisting of solid weight, powder-based weight, a dense liquid weight, bead, magnet, and wire-shaped weight.

17. A fishing reel for tallying incremental data and adapted to be secured to a selected fishing rod, said fishing reel comprising:
   a frame having an inner surface and an outer surface;
   a spool carried by said frame;
   a handle adapted for winding said spool;
   an adjustable, variable drag including a drag gear, a directional pawl cam removably secured to said inner surface of said frame and adapted to engage said drag gear, and a spring loaded drag knob adapted for adjusting said adjustable, variable drag;
   a hanger plate adapted for securing said fishing reel to said fishing rod; and
   an incremental metering assembly in cooperation with said combination of said fishing reel and said selected fishing rod.

18. The fishing reel of claim 17 wherein said incremental metering assembly is integrated into a reel mount such that it is secured to said hanger plate and further wherein said incremental metering assembly includes at least one incremental meter wheel having numeric indicia adapted for keeping a tally; at least one detent ball in cooperation with a spring adapted for detent alignment for positioning said incremental meter wheel and a lens adapted and aligned for viewing a selected numeric indicia.

19. The fishing reel of claim 18 wherein said lens is adapted for magnifying said selected numeric indicia.

20. The fishing reel of claim 17 wherein said incremental metering assembly is adapted to be integrated into said fishing reel.

21. The fishing reel of claim 17 wherein said incremental metering assembly is integrally attached to said hanger plate.

22. The fishing reel of claim 17 wherein said incremental metering assembly is defined by an electronic incremental meter including circuitry adapted to respond to at least a selectively actuated up button and a selectively actuated down button and display a tally using digital numeric indicia.

* * * * *